United States Patent
Rautiainen et al.

(10) Patent No.: US 11,266,900 B2
(45) Date of Patent: Mar. 8, 2022

(54) SYSTEM TO SUPPORT MULTIPLE BATTERY PACKS OF DIFFERENT CAPACITY AND A SENSOR SYSTEM

(71) Applicant: Neutron Holdings, Inc., San Francisco, CA (US)

(72) Inventors: Jukka Rautiainen, Espoo (FI); Mark Frykman, Mountain View, CA (US); Asa Weiss, Santa Rosa, CA (US); Mike McHugh, Pacifica, CA (US); John Ulmen, Emerald Hills, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

(21) Appl. No.: 16/142,336

(22) Filed: Sep. 26, 2018

(65) Prior Publication Data

US 2019/0091553 A1 Mar. 28, 2019

Related U.S. Application Data

(60) Provisional application No. 62/563,551, filed on Sep. 26, 2017.

(51) Int. Cl.
*A63C 17/12* (2006.01)
*A63C 17/01* (2006.01)
(Continued)

(52) U.S. Cl.
CPC ........ *A63C 17/017* (2013.01); *A63C 17/0006* (2013.01); *A63C 17/01* (2013.01);
(Continued)

(58) Field of Classification Search
CPC ....... A63C 17/12; A63C 17/01; A63C 17/011; A63C 17/012; H01M 50/267; H01M 50/249; H01M 50/204
See application file for complete search history.

(56) References Cited

U.S. PATENT DOCUMENTS 5,020,621 A * 6/1991 Martin .................... A63C 17/01
180/180
5,893,425 A * 4/1999 Finkle .................. A63C 17/015
180/181

(Continued)

FOREIGN PATENT DOCUMENTS

| CN | 202923418 U | 5/2013 |
| EP | 0870641 A | 10/1998 |
| WO | 2014152951 A1 | 9/2014 |

*Primary Examiner* — Jeffrey J Restifo
(74) *Attorney, Agent, or Firm* — Dentons US LLP

(57) ABSTRACT

Methods and apparatus are discussed for an electric powered personal transportation vehicle with electric motors powered by one or more batteries. A set of universal battery mounting hole locations and a reserved space for one or more battery housings exist on a board for the personal transportation vehicle. The reserved space on the board for the one or more battery housings that house one or more battery packs is set to not interfere with an operation of the motors or the wheels. A first battery pack containing the one or more batteries differs in at least one of i) a different amp-hour capacity, ii) a different length, width, or height, and iii) a different shape than another battery pack designed to be physically contained in the one or more battery housings and electrically connect with corresponding electrical connections in the one or more battery housings.

19 Claims, 12 Drawing Sheets

(51) Int. Cl.
  *B60L 58/20* (2019.01)
  *B60L 50/60* (2019.01)
  *A63C 19/06* (2006.01)
  *H01M 50/20* (2021.01)
  *A63C 17/00* (2006.01)
  *A63C 17/26* (2006.01)
  *B32B 17/06* (2006.01)
  *B32B 5/24* (2006.01)
  *A45F 3/04* (2006.01)

(52) U.S. Cl.
  CPC .......... *A63C 17/012* (2013.01); *A63C 17/015* (2013.01); *A63C 17/12* (2013.01); *A63C 17/26* (2013.01); *A63C 19/065* (2013.01); *B60L 50/66* (2019.02); *B60L 58/20* (2019.02); *H01M 50/20* (2021.01); *A45F 3/04* (2013.01); *A63C 2019/067* (2013.01); *A63C 2203/12* (2013.01); *A63C 2203/14* (2013.01); *A63C 2203/22* (2013.01); *A63C 2203/24* (2013.01); *A63C 2203/42* (2013.01); *B32B 5/245* (2013.01); *B32B 17/06* (2013.01); *B32B 17/062* (2013.01); *B32B 17/066* (2013.01); *H01M 2220/20* (2013.01)

(56) References Cited

U.S. PATENT DOCUMENTS

| | | | |
|---|---|---|---|
| 7,293,622 B1 * | 11/2007 | Spital | A63C 17/12 180/180 |
| 7,998,611 B2 * | 8/2011 | Yoshihara | H01M 50/502 429/148 |
| 8,061,725 B1 * | 11/2011 | Hawkins | A63C 17/12 280/87.042 |
| D670,419 S | 11/2012 | Fissell | |
| D670,696 S | 11/2012 | Cobbett et al. | |
| D685,419 S | 7/2013 | Ahmad et al. | |
| D688,245 S | 8/2013 | Guerra | |
| D688,664 S | 8/2013 | Guerra | |
| 8,889,283 B2 * | 11/2014 | Marchio | H01M 10/6557 429/120 |
| 8,974,941 B2 * | 3/2015 | Shimoyama | H01M 50/20 429/120 |
| 8,974,951 B2 * | 3/2015 | Park | H01M 50/213 429/159 |
| 9,004,213 B2 * | 4/2015 | Larson | A63C 17/12 180/181 |
| 9,211,470 B2 * | 12/2015 | Bigler | A63C 17/014 |
| 9,266,445 B2 | 2/2016 | Dastoor et al. | |
| 9,302,173 B2 * | 4/2016 | DiCarlo | A63C 17/012 |
| 9,387,388 B2 * | 7/2016 | King | A63C 17/015 |
| 9,393,483 B2 * | 7/2016 | Tan | A63C 17/12 |
| 9,399,406 B2 | 7/2016 | Dastoor et al. | |
| 9,673,432 B2 * | 6/2017 | Tian | A63C 17/12 |
| 9,908,580 B2 * | 3/2018 | Doerksen | A63C 17/016 |
| 10,071,303 B2 * | 9/2018 | Pikulski | A63C 17/262 |
| 10,245,936 B2 * | 4/2019 | Gillett | G05D 1/0088 |
| 10,456,658 B1 * | 10/2019 | Doerksen | G01C 19/42 |
| 10,576,360 B2 * | 3/2020 | Quick | A63C 17/01 |
| 10,611,261 B2 * | 4/2020 | Pang | B60L 15/2036 |
| 10,906,470 B2 * | 2/2021 | Hernandez | B60R 7/02 |
| 10,926,159 B1 * | 2/2021 | Smith | A63C 17/013 |
| 10,926,161 B1 * | 2/2021 | Sevak | H02N 15/00 |
| 10,926,162 B2 * | 2/2021 | Han | A63C 17/14 |
| 2005/0006158 A1 * | 1/2005 | Tsai | A63C 17/12 180/167 |
| 2010/0222941 A1 * | 9/2010 | Chang | A63C 17/12 701/2 |
| 2013/0081891 A1 * | 4/2013 | Ulmen | A63C 17/12 180/181 |
| 2014/0277888 A1 | 9/2014 | Dastoor et al. | |
| 2016/0121756 A1 | 5/2016 | Dastoor et al. | |
| 2016/0303997 A1 | 10/2016 | Dastoor et al. | |
| 2017/0252638 A1 * | 9/2017 | Ulmen | A63C 17/015 |
| 2017/0259697 A1 | 9/2017 | Dastoor et al. | |

* cited by examiner

SYSTEM TO SUPPORT MULTIPLE BATTERY PACKS OF DIFFERENT CAPACITY AND A SENSOR SYSTEM

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATIONS

This patent application claims priority to and benefit under 35 USC 119 to U.S. Provisional Patent Application No. 62/563,551, filed Sep. 26, 2017, titled "An electric personal transportation vehicle with various improvements," which is hereby incorporated herein by reference in its entirety.

FIELD

Embodiments of the design provided herein generally relate to an electric-powered personal transportation vehicle, such as an electric-powered personal transportation vehicle, having an improved battery and sensor system.

BACKGROUND

People need a better mechanism and supporting system to move around safely without the vulnerabilities of traditional vehicles.

SUMMARY

Provided herein are some embodiments. In an embodiment, the design is directed to an electric personal transportation vehicle, a mobile application, and a backend cloud platform to support this system.

Methods and apparatus are discussed for a system to support multiple battery packs of different capacity and a sensor system. In an embodiment, a set of universal battery mounting hole locations and a reserved space for one or more battery housings exist on a board for the personal transportation vehicle. The reserved space on the board for the one or more battery housings that house one or more battery packs is set to not interfere with an operation of the motors or the wheels. A first battery pack containing the one or more batteries differs in at least one of i) a different amp-hour capacity, ii) a different length, width, or height, and iii) a different shape than another battery pack designed to be physically contained in the one or more battery housings and electrically connect with corresponding electrical connections in the one or more battery housings.

These and other features of the design provided herein can be better understood with reference to the drawings, description, and claims, all of which form the disclosure of this patent application.

DRAWINGS

The drawings refer to some embodiments of the design provided herein in which.

Figure 1:
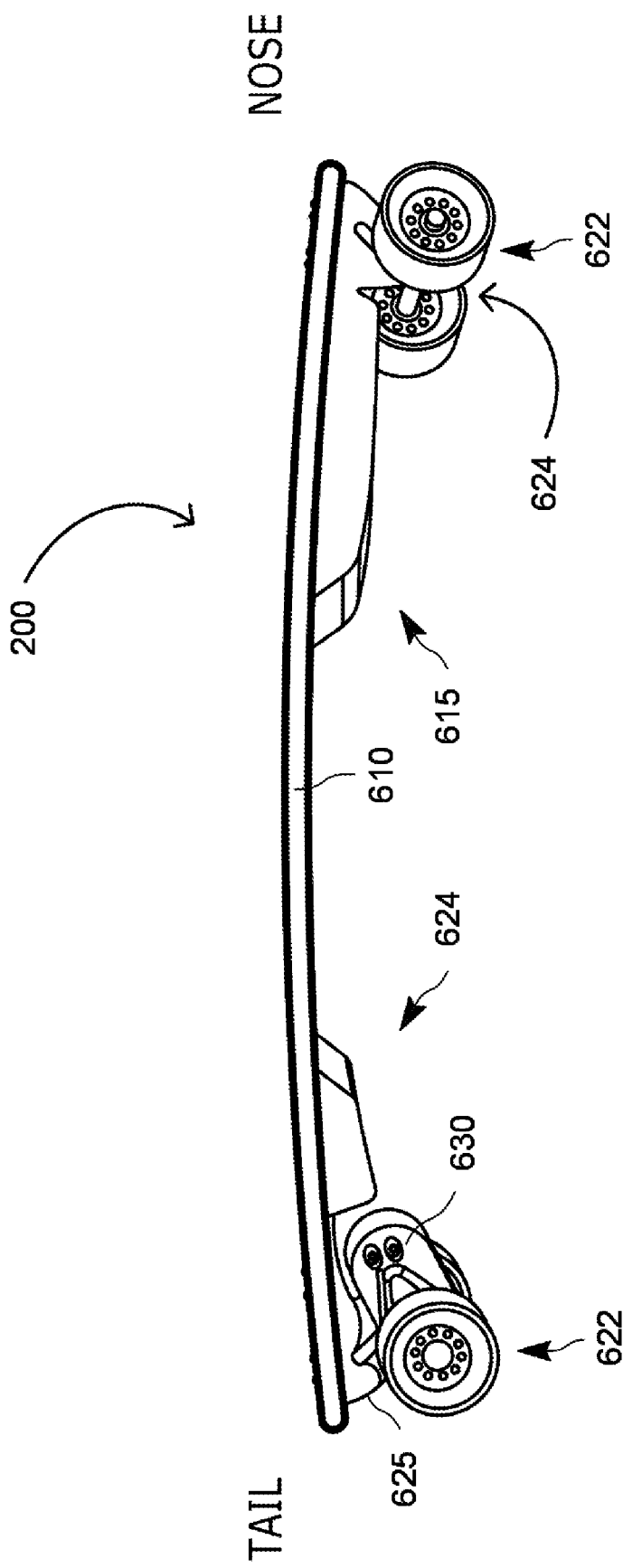
FIG. 1 illustrates an example embodiment of an electric-powered personal transportation vehicle that includes a board, one or more wheels, and one or more electric motors mounted to a drive truck.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of electrical circuits in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first electric-powered skateboard, can be made. However, the specific numeric reference should not be interpreted as a literal sequential order but rather interpreted that the first electric-powered skateboard is different than a second electric-powered skateboard. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the design is directed to an electric personal transportation vehicle, such as i) an electric-powered skateboard, ii) an electric-powered scooter, iii) an electric-powered wheelchair, and iv) other personal transportation vehicles.

The electric-powered personal transportation vehicle, such as an electric-powered skateboard, has many features and some example features will be discussed below. In general, an embodiment discussing an electric-powered skateboard will be discussed as an example embodiment. In general, the system supports multiple battery packs of different capacity and a sensor system FIG. 1 illustrates an example embodiment of an electric-powered electric personal transportation vehicle that includes a composite board, one or more wheels and one or more electric motors mounted to a drive truck. The electric-powered personal transportation vehicle 200, such as a skateboard illustrated here, may include a composite board 610, one or more wheels 622, one or more electric motors 630 mounted to a first drive truck 625 of one or more trucks 624, and one or more batteries 615 to power the one or more electric motors 630. For example, a pair of trucks 624 are mounted to a bottom of the composite board 610, and each truck of the pair of trucks includes an axle. The one or more batteries 615 power the electric motor 630, which is configured to drive the wheels by way of a drive system. The composite board 610 is configured to support a rider's weight while standing on the composite board 610 and operating an electric-powered personal transportation vehicle 200.

A drive truck 625 supports one or more wheels. The electric motor(s) is configured to drive the wheels. The drive truck 625 is mounted to the composite board 610 at either a front (or nose) of the composite board 610 or a back (or tail) or the composite board 610. The drive truck 625 is mounted to the composite board at the front and back of the composite board in FIG. 1. One or more batteries 615 within one or more enclosures eventually mount to the composite board 610 behind the front truck 624 or in front of the rear truck 625. For example, the battery 615 is mounted to the composite board within a battery enclosure behind the front truck in FIG. 1. In addition, the batteries 615 may mount to a bottom surface of the composite board 610 or within a compartment within the composite board 610. The internal portions of the composite board 610 itself may be the battery enclosure 615, with no need for a secondary battery enclosure. The one or more batteries 615 supply power to the electric motor or motor 630, electric light or lights, and other electronic equipment including various sensors. One or more processors and various software routines are configured to control the operation of the electric motor(s), light(s), sensor(s), etc.

Figure 2:
FIG. 2 illustrates an example embodiment of an electric-powered personal transportation vehicle that includes a board, and a weight of a rider being supported by the board, truck, and wheels.

FIG. 2 illustrates an example embodiment of an electric-powered electric personal transportation vehicle that includes a deck, and a weight of a rider being supported by the deck, truck, and wheels. In this example electric personal transportation vehicle 200, the rider may change the angles of the composite board by shifting their weight on the composite board and/or via commands given through the wireless remote. Changing the balance of the rider's weight may be used as a control input for steering and/or acceleration and/or braking.

The electric-powered electric personal transportation vehicle 200 may be controlled by a wireless remote. The wireless remote may be a stand-alone hand-held device (as shown) or in an embodiment a suitably programmed mobile computing device typically running a software application resident on that mobile computing device. In an example embodiment, the mobile computing device may be a smart phone, a smart watch, a tablet computer, etc. The mobile computing device may include a wireless transmitter, such as a radio antenna, for wirelessly communicating with the electric personal transportation vehicle. The wireless remote may use one or more antenna and/or transmission frequency to provide signals to the electric-powered electric personal transportation vehicle. Communication may be one way, two way, or networked among multiple devices communicating together with each other and/or with the electric-powered electric personal transportation vehicle 200.

Figure 3:
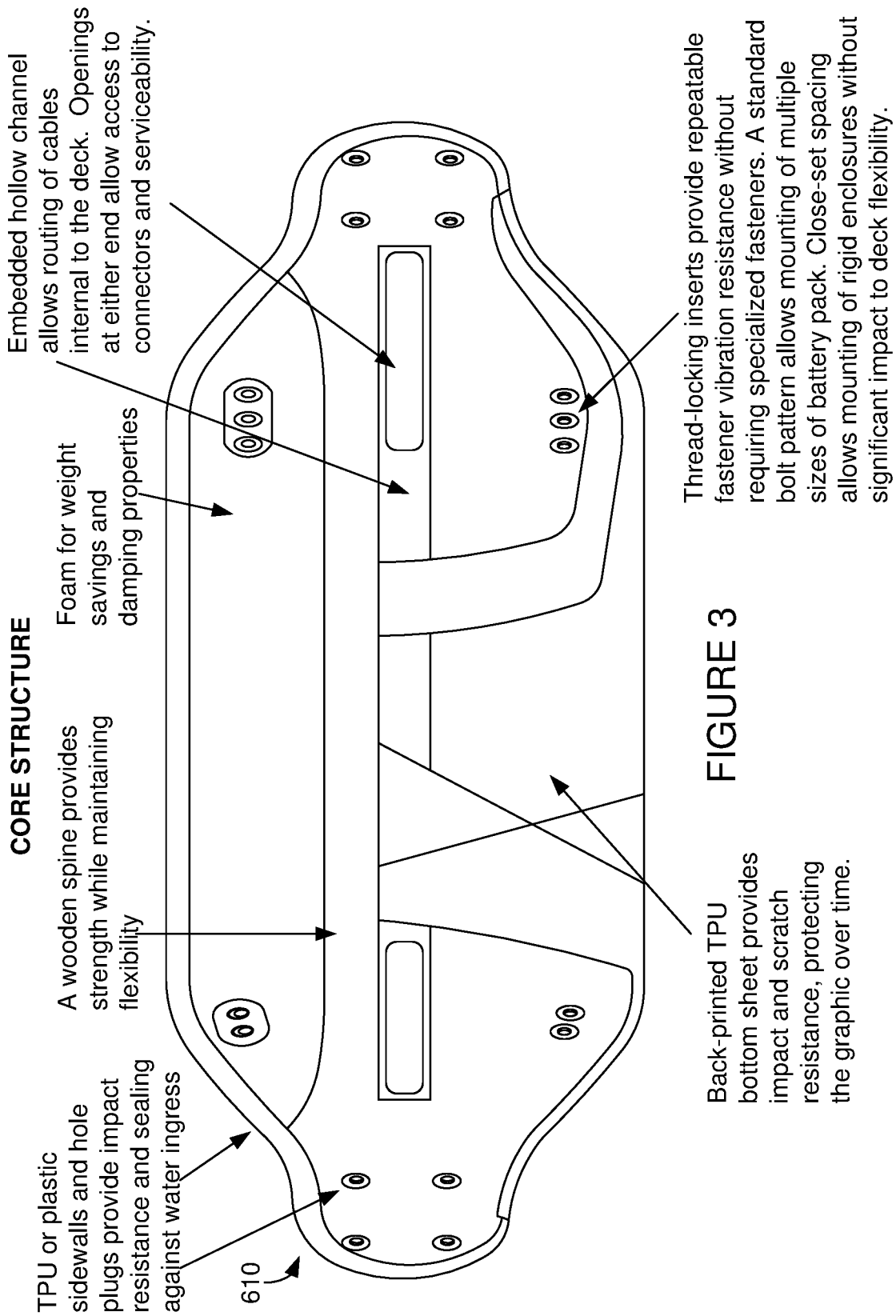
FIG. 3 illustrates an example embodiment of a set of universal battery mounting hole locations and a reserved space for one or more battery housings on a board for the personal transportation vehicle.

FIG. 3 illustrates an example embodiment of a set of universal battery mounting hole locations and a reserved space for one or more battery housings on a board 610 for the personal transportation vehicle. The reserved space on the board 610 for one or more battery housings that house one or more battery packs is set to not interfere with an operation of the motors, the wheels, or other equipment in the electric powered personal transportation vehicle. An example first battery pack containing the one or more batteries differs in at least one of i) a different amp-hour capacity, ii) a different length, width, or height, and iii) a different shape than another battery pack designed to be physically contained in the one or more battery housings and electrically connect with corresponding electrical connections in the one or more battery housings. (e.g. see FIGS. 6-9)

Figure 11:
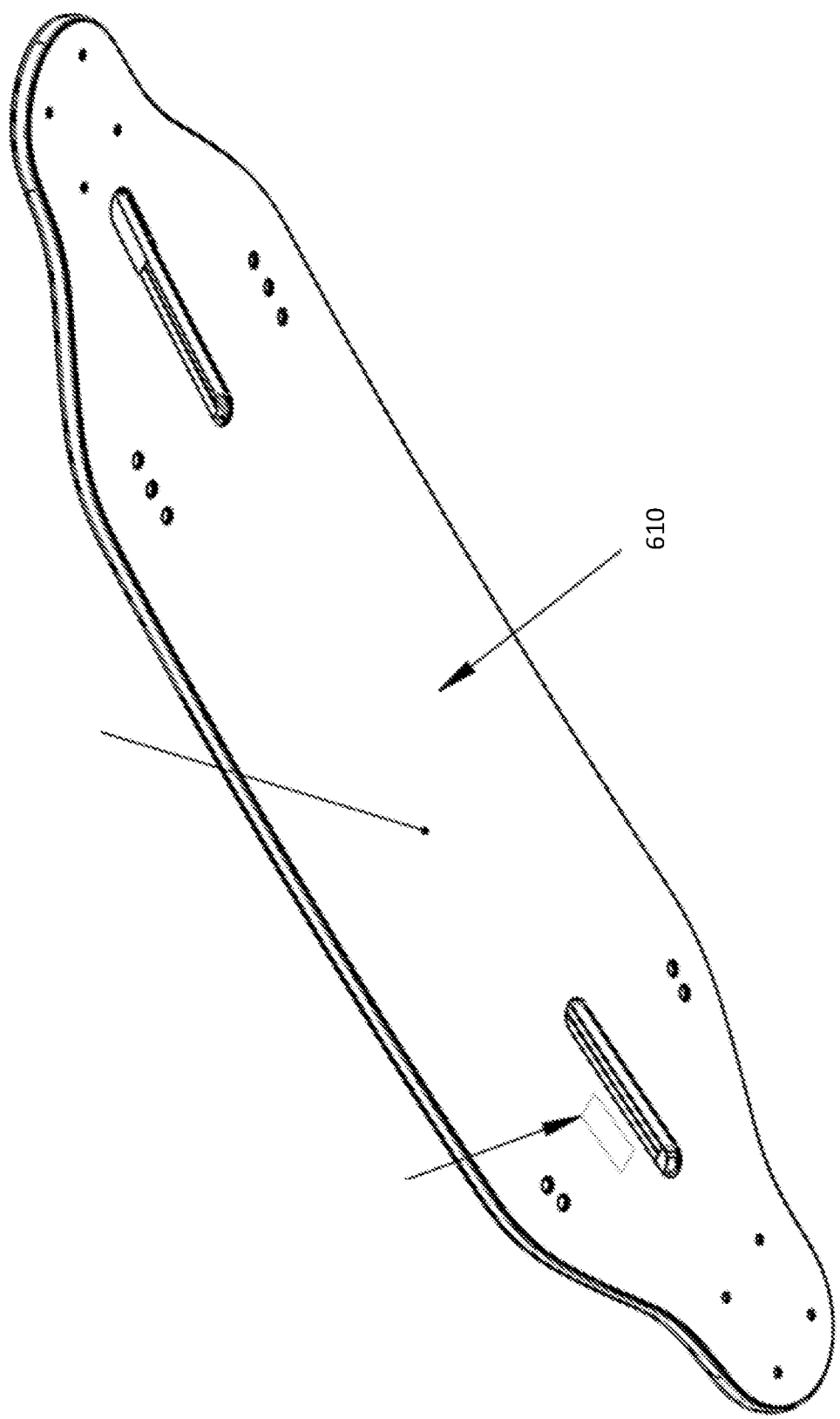
FIG. 11 illustrates an example embodiment of a board for an electric-powered personal transportation vehicle that has the same set of battery mounting holes, reserved clearance space, and electrical connections to support a universal mounting system.

FIGS. 3 and 11 illustrate an example embodiment of a board 610 for an electric-powered personal transportation vehicle that has the same set of battery mounting holes, reserved clearance space, and electrical connections to support a universal mounting system. The universal battery mounting holes cooperate with a set of modular battery packs to electrically and physically work within that universal mounting system. The universal battery mounting system allows i) the same removable housing or ii) a set of multiple housings for the battery, that electrically and physically work for multiple different battery packs of different capacities and slightly varying size or shape.

Figure 10:
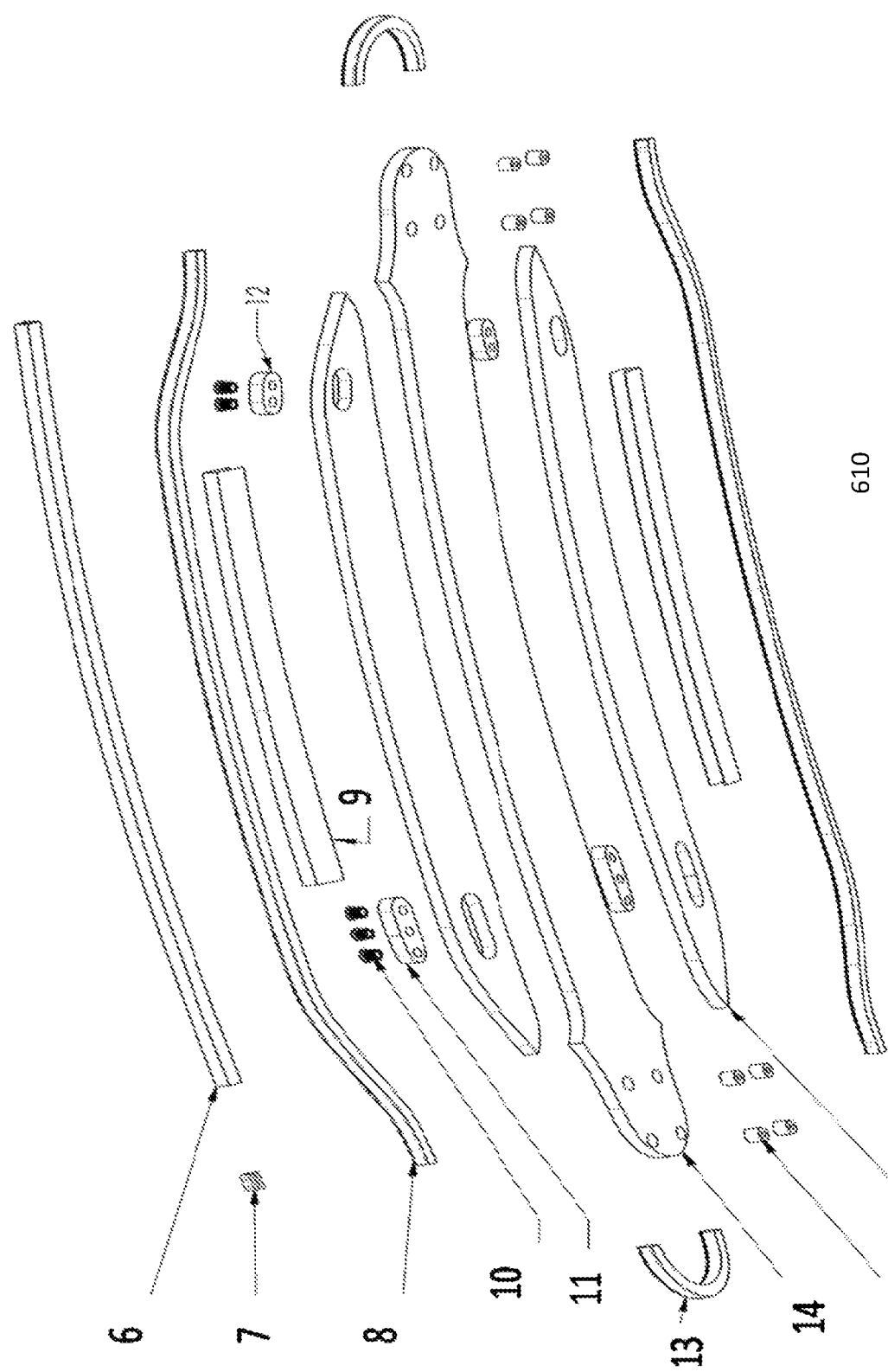
FIG. 10 illustrates an exploded view of portions of an example embodiment of the board with reinforced connection points.

FIGS. 3 and 10 show reinforced connection points in the board 610 for the set of mounting holes. FIG. 10 illustrates an exploded view of portions of an example embodiment of the board 610 with reinforced connection points 11. The set of universal battery mounting hole locations can use reinforced connection points 11 in the hole locations of the board 610 to make these mechanical connection points 11 between the housing and the board 610, durable and vibration resistant to maintain a solid connection without fracturing or deforming at these connection sites. In an embodiment, the personal transport vehicle has reinforced connection points 11 located in a vibration-dampening high-density foam of the board 610 for the personal transportation vehicle. The reinforced connection points 11 may be an insert made of lightweight wood, such as poplar, or a metal, such as brass. The reinforced connection points 11 make the mating holes stronger with increased durability. This also allows use of lightweight material, such as vibration-dampening high-density foam. The foam with these inserts maintains a solid connection without fracturing or deforming at these connection sites while decreasing an amount of overall weight of the personal transportation vehicle. In an embodiment, the reinforced connection points 11 are a set of thread locking helicoil inserts, made of knurled, press-in brass. The thread-like inserts provide repeatable fastener vibration resistance without requiring specialized fasteners to not come loose during the repeated high torque situations that the vehicle can experience. The threadlike insert has a standard bolt pattern that allows mounting of multiple sizes of battery packs in the battery housings. The close-set setting and spacing of the multiple mounting fasteners allows mounting of rigid enclosures without significant impact to the deck flexibility.

Universal Battery Housing and Batteries

Figure 7:
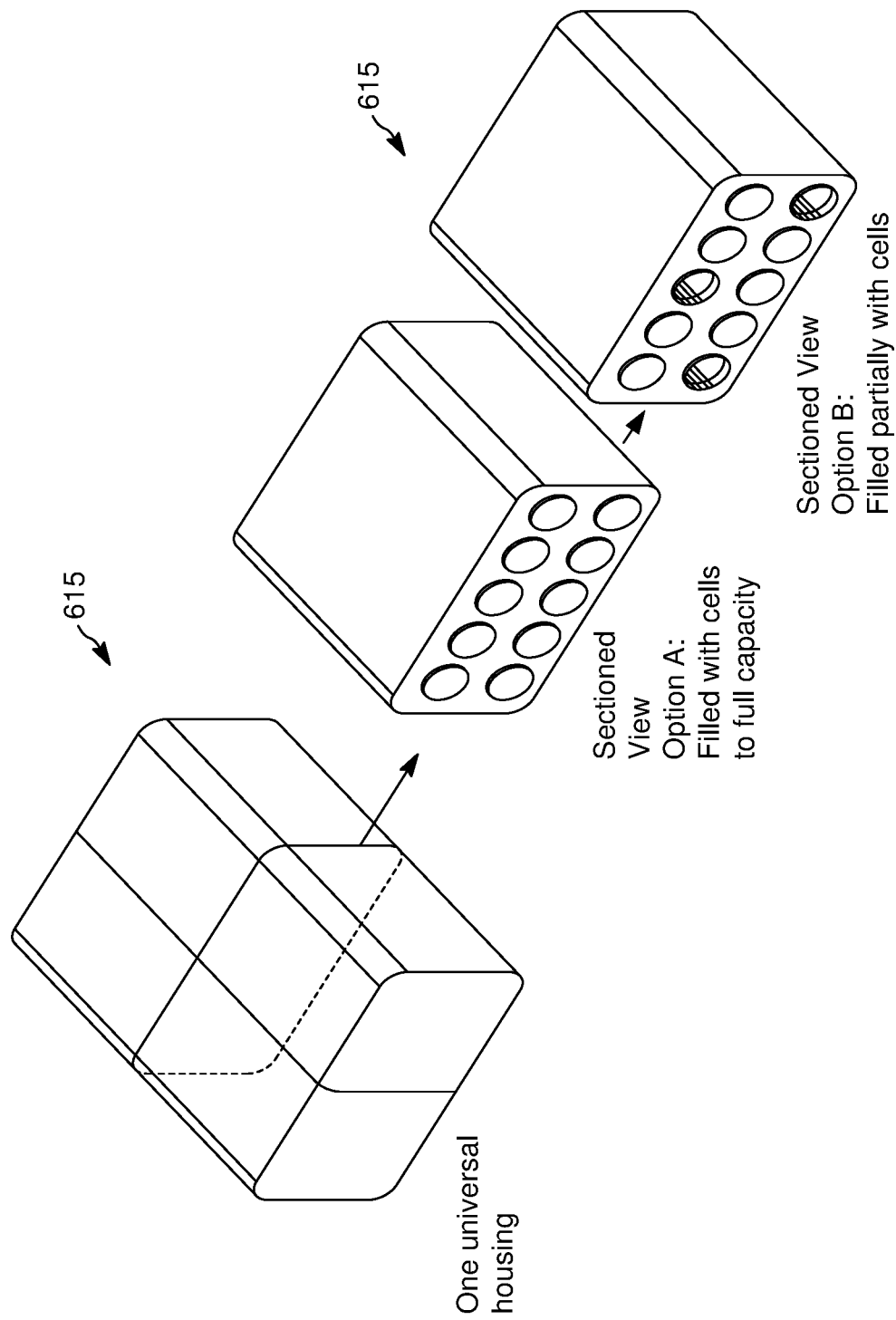
FIG. 7 illustrates an example embodiment of an electric-powered personal transportation vehicle that has a universal battery housing with its battery cells.
Figure 8:
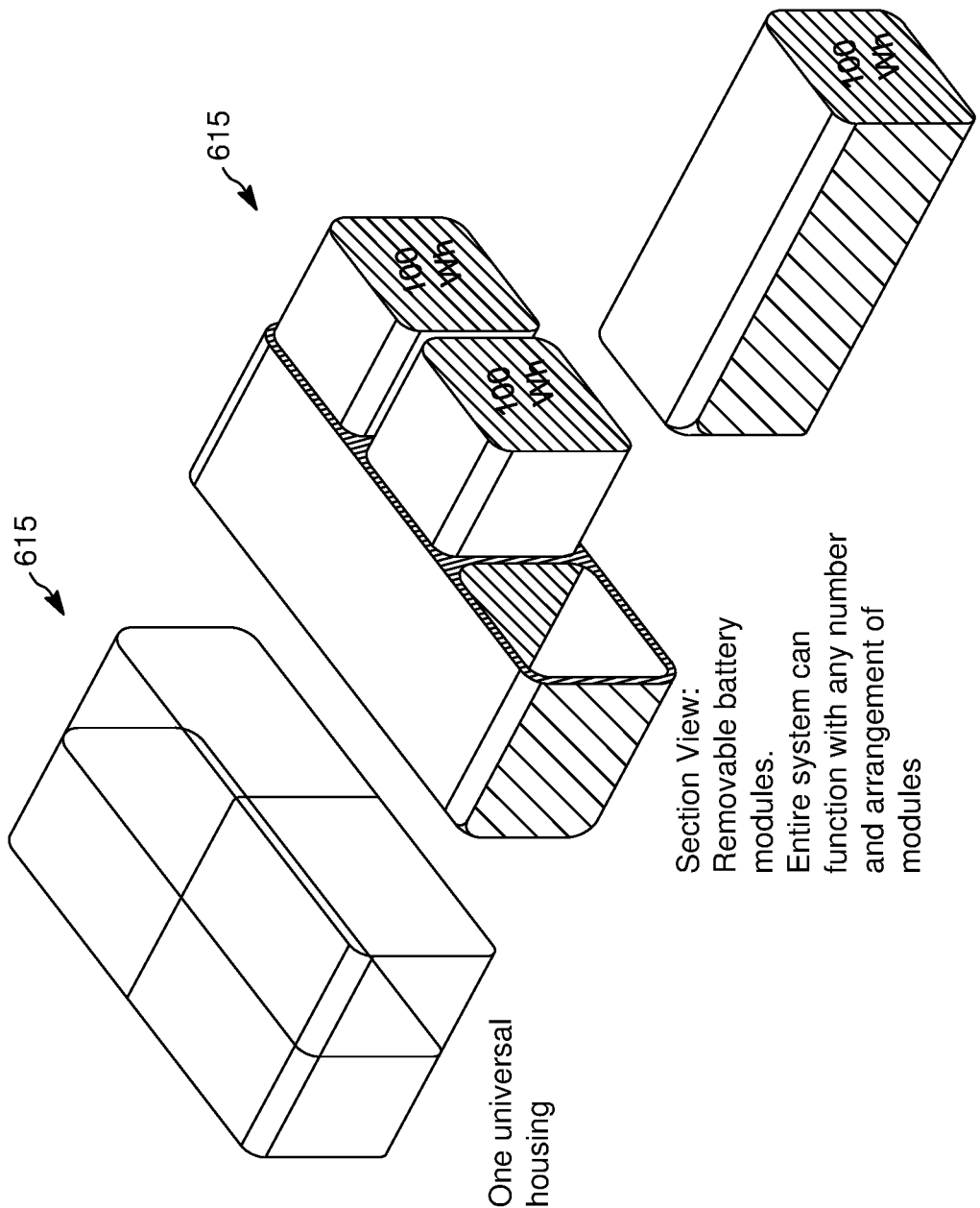
FIG. 8 illustrates an example embodiment of an electric-powered personal transportation vehicle that has a universal battery housing with its battery packs.
Figure 9:
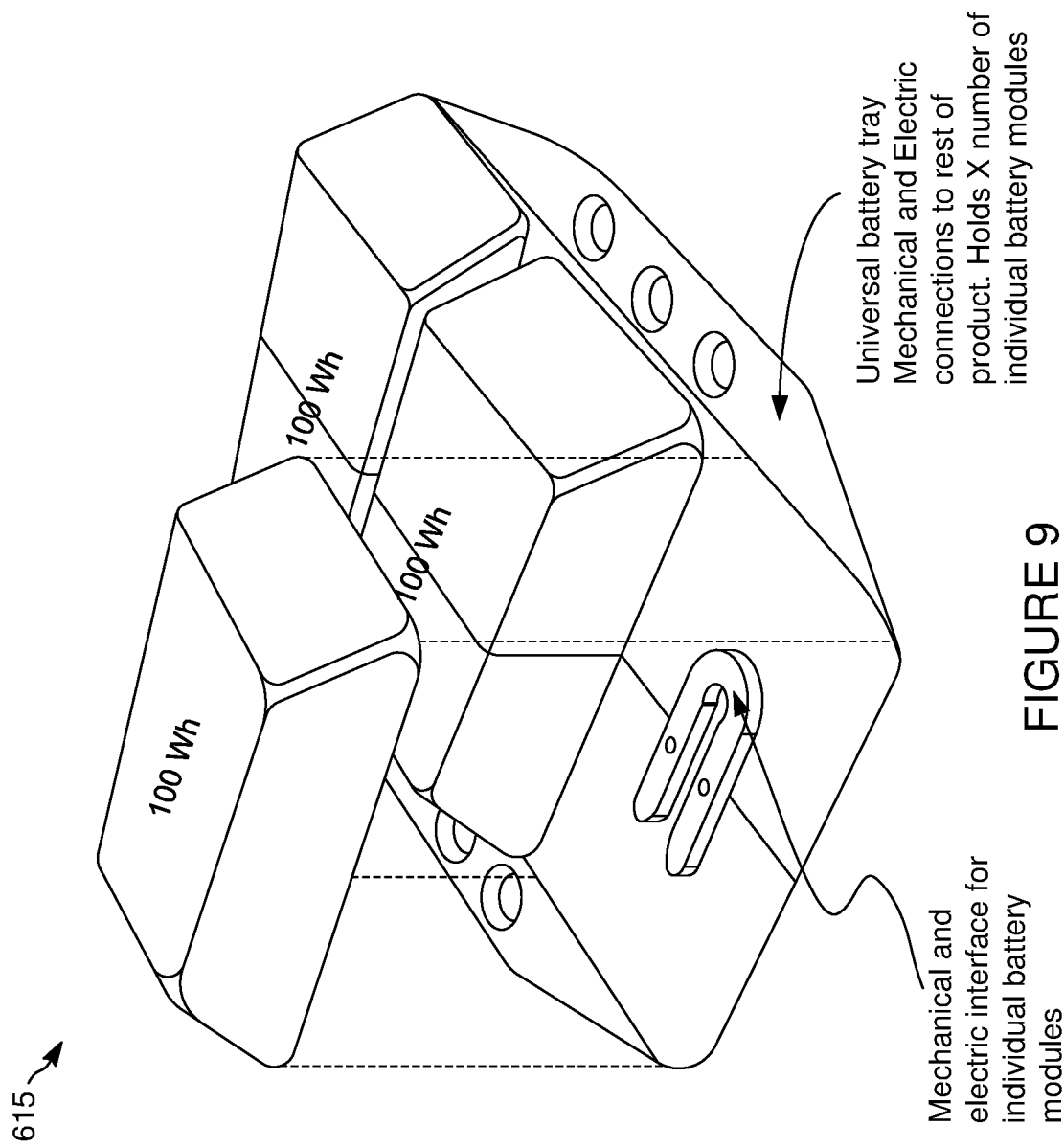
FIG. 9 illustrates an example embodiment of an electric-powered personal transportation vehicle that has a universal battery housing with its main battery mounted to the board.

FIGS. 7-9 illustrate example embodiments of an electric-powered personal transportation vehicle that has a universal battery housing 615 with its main battery mounted to the board. The same removable battery housing 615 for the battery mounts/bolts into the board of the personal transportation vehicle, and works for multiple different batteries of different capacities that slightly vary in physical size and/or shape.

For example, a battery housing 615 has multiple pockets, (e.g. see FIGS. 7-9) and each pocket is designed to house its own battery cell. Not all of the pockets need to be filled with a battery cell for the battery pack to output a voltage. Note, a first battery pack made up of the battery cells in a first pocket of the battery housing 615 differs in amp-hour capacity than a second battery pack in a second pocket of the battery housing 615. In addition, each battery pack housed in the battery housing 615 may have the same amp-hour capacity and electrically and physically connect up to supply power to the various components on the vehicle.

The same battery housing 615 can house and integrate, for example, i) a 6-7 mile capacity battery and ii) an extended bigger version of a 12 mile capacity battery. Likewise, the same battery housing 615 may also be configured in size and shape to house multiple batteries, each battery pack under 100 watt-hours individually. This may provide a competitive advantage by allowing batteries to be sized below regulatory limits affecting shipping, while still allowing the electric-powered personal transportation vehicle to have a group of batteries installed together that store more energy in total than a regulatory shipping regulation may allow for an individual battery. Regulatory limits may change over time, and the system could use whichever size battery best meets regulatory requirements. Additionally, the system could run on a single or multiple batteries. This can allow for the system to be mounted with a total battery energy below a regulatory limit that allows the system to be brought onto an airplane for travel. The multiple batteries in that battery housing 615 are configured to electrically provide power evenly from each battery or distributed intelligently between batteries depending on their state of charge. For instance, if all batteries are charged the same amount, the energy may be drawn or regenerated into the batteries evenly. If one battery is less charged than others, it may be drawn on less and regenerated into more than the other batteries, creating an automatic balancing effect for charge. One battery may also be of a higher or lower power capacity than other batteries and can serve to allow for high power discharge events while still allowing maximum range. High-energy batteries would allow for long range and high power batteries would allow for intermediate bursts of high power. This hybrid battery system may outperform a uniform battery system. A standard mounting system is used for LEV battery that allows multiple different batteries of different sizes/powers/capacities to be mounted to the same system. Bigger capacity batteries have more travel restrictions on how they can be transported in a commercial airplane. Overall, the multiple batteries configured to cooperate with each other grants a greater traveling range to the personal transportation vehicle balanced with easy travel through existing public infrastructure as well as ease of shipping the personal transportation vehicle.

Note, the universal battery mount gives the user options to adapt the use of the board 610. For example, battery options with a 6-7 mile range is great for short city commutes and fully certified for airline travel. The extended battery, providing 12 miles of range, is perfect for longer commutes and epic rides. Batteries of different sizes may be available in the future for mounting on the same system. The battery housing with multiple pockets allows incorporating in these future batteries. Also, the main batteries are user replaceable and rechargeable, which allow you to swap packs in minutes or less when they need to be recharged or when they need to be removed for travel or transport.

Figure 6:
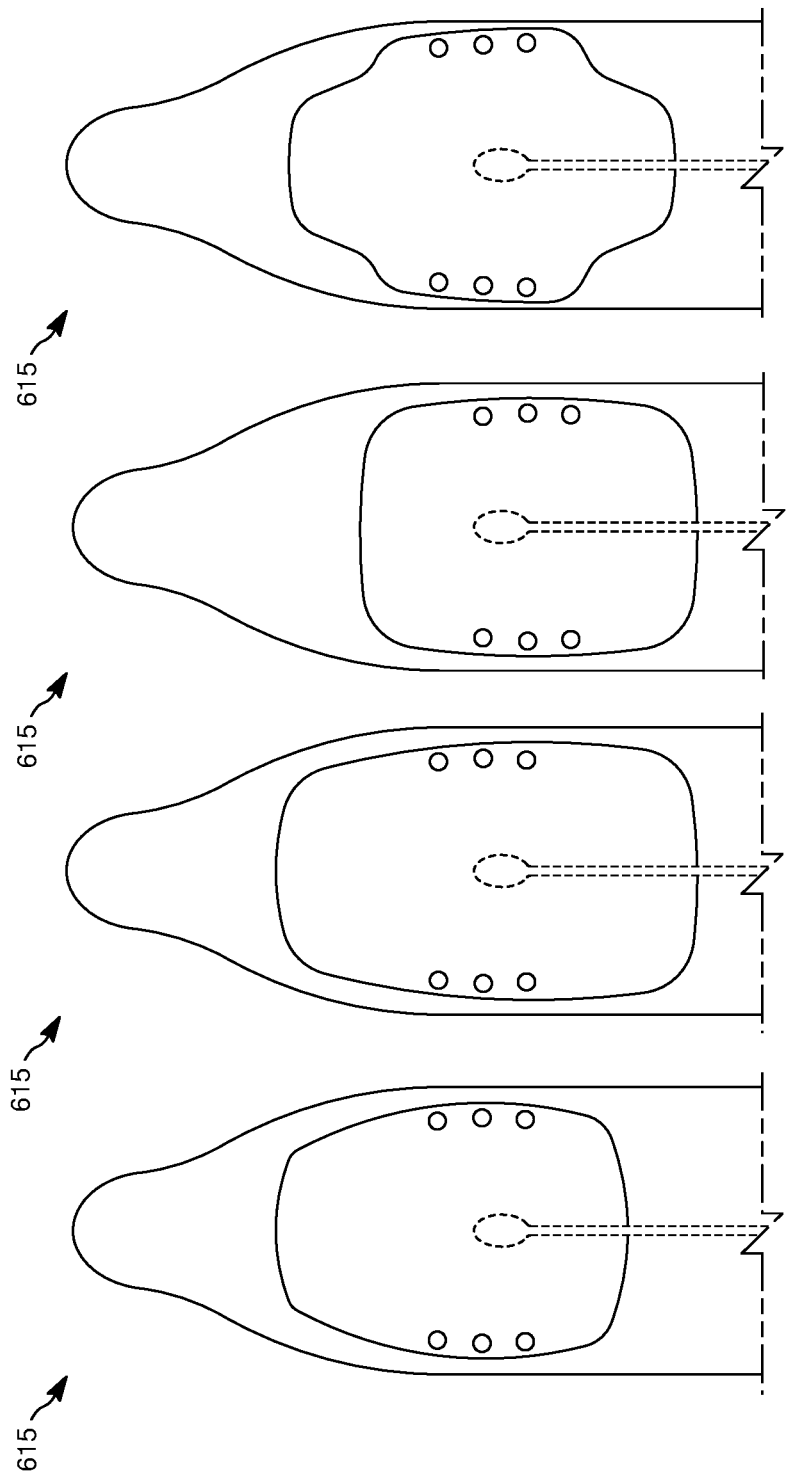
FIG. 6 illustrates an example embodiment of an electric-powered personal transportation vehicle that has the same set of removable housings for the battery packs that couple to a same set of mounting holes in the board.

FIG. 6 illustrates an example embodiment of an electric-powered personal transportation vehicle that has the same set of removable housings 615 for the battery packs that couple to a same set of mounting holes in the board 610. The example four different shaped and sized battery housings 615 all couple to the same set of reinforced connection points 11 for the mounting holes shown in FIGS. 3 and 11.

In an embodiment, the same set of removable battery housings 615 for the battery packs that work for multiple different battery packs of different capacities and slightly varying size or shape. The different shaped and sized removable battery housings 615 can all mate up to the same set of mounting connections and reserved space on the board 610 for multiple different battery packs of different capacities and slightly varying size or shape.

The example first battery housing, (e.g. a rounded shield shape), has a different length, width, or height, to give the different shape than a second battery housing, (e.g. a rounded cross shape), which is constructed to mount in the same set of universal battery mounting hole locations and reserved space for the one or more battery housings on the board 610. In an embodiment, the first battery housing houses a first battery pack that can differ in amp-hour capacity than the second battery pack in the second battery housing.

Figure 4:
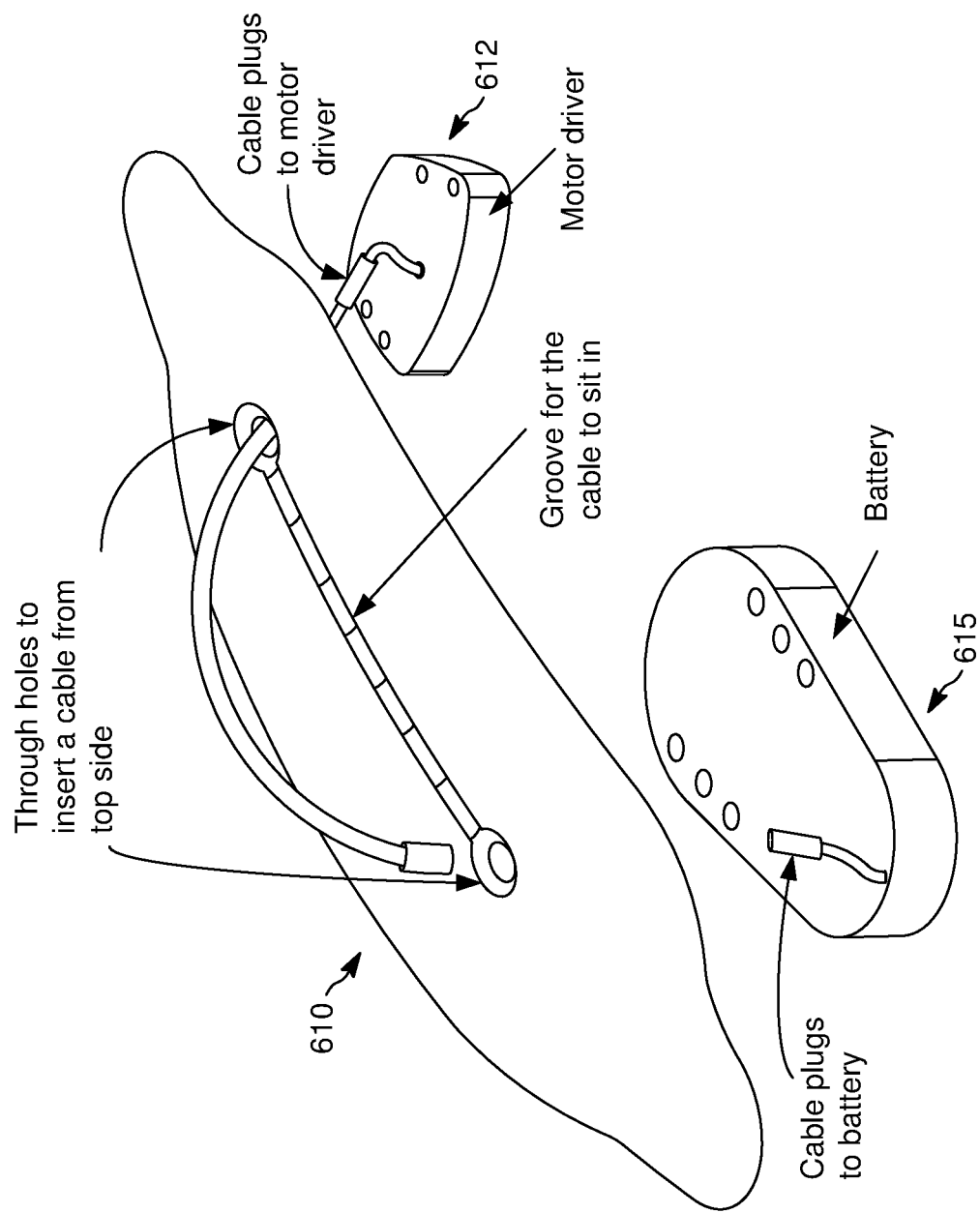
FIG. 4 illustrates an example embodiment of a motor driver and motor that can operate over a wide range of input voltages supplied from the battery in the battery housing enclosure.
Figure 5:
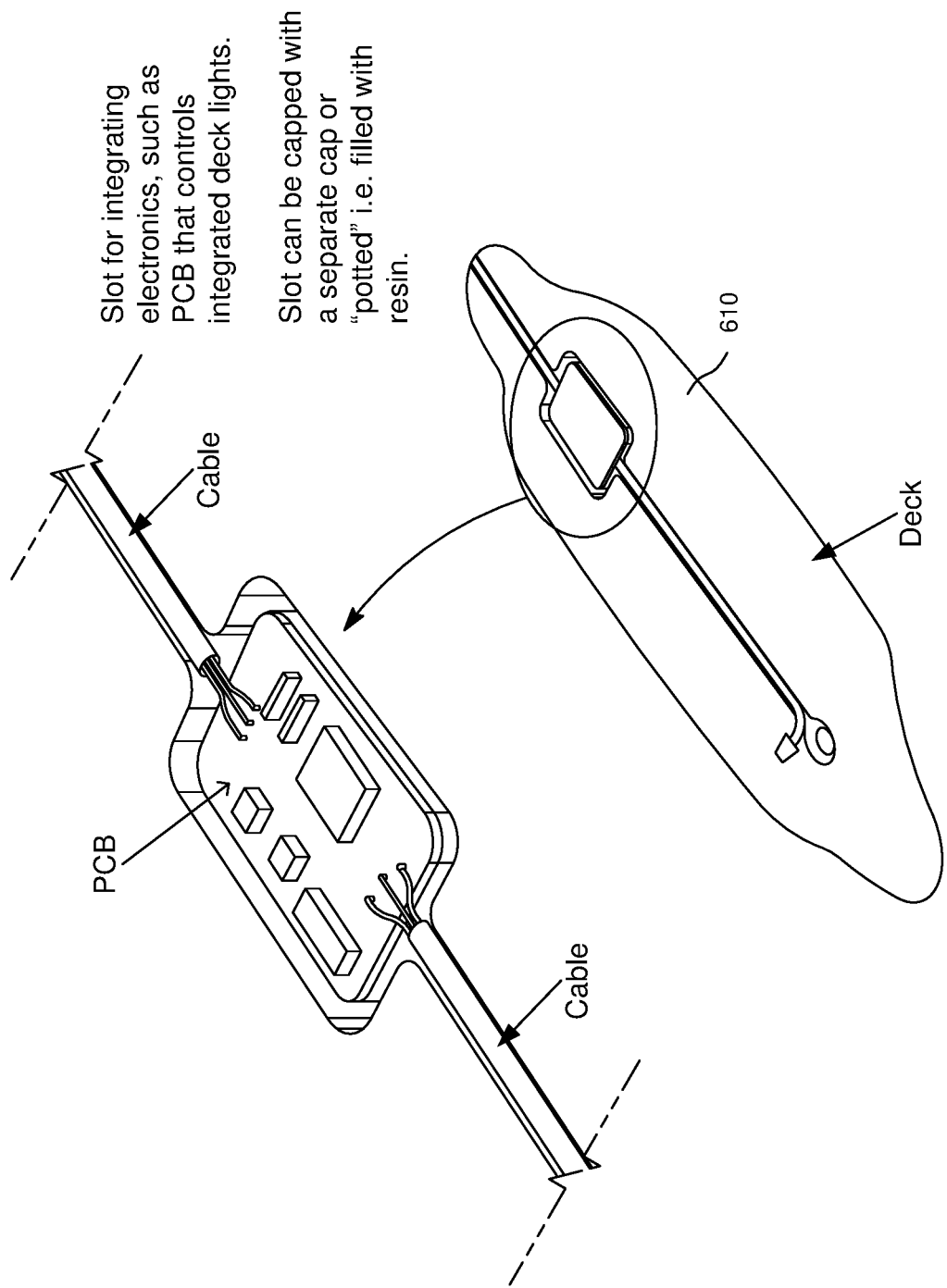
FIG. 5 illustrates an example embodiment of the board with internal compartments to house electronic circuits and sensors for the vehicle.

FIG. 4 illustrates an example embodiment of a motor driver and motor that can operate over a wide range of input voltages supplied from the battery in the battery housing enclosure 615. FIG. 5 illustrates an example embodiment of the board 610 with compartments to house electronic circuits, such as internal voltage supply circuits, for the vehicle. From a design basis, particular components, such as the motor driver, the motor, and internal voltage supply circuits located on the vehicle, are chosen that can operate over a wide range of input voltages. These devices can operate over a wide range of input voltages, such as 20 volts to 60 volts DC input. The motor driver then steps up or steps down voltage to convert the input battery voltage from the battery to act as a voltage supply to the different components within the system. Similarly, the internal voltage supply circuits can step up or step down voltage to convert the input battery voltage from the battery to act as a voltage supply to the different components within the system. In an embodiment, a motor driver and the motors are designed to operate over at least a ten volt range of input voltages to support different battery packs that differ in amp-hour capacity. In an embodiment, a motor driver and the motors are designed to operate over at least a twenty volt range of input voltages to support different battery packs that differ in amp-hour capacity.

Multiple different battery packs can fit into that same housing. The vehicles motor drive system and other components can electrically accommodate the different voltage and/or current capacities from those different possible packs. This can also include allowing certain modes or settings change depending on what battery pack is installed.

Sensor Feedback Network for the Personal Transportation Vehicle

FIGS. 4-5 illustrate example embodiments of an electric-powered personal transportation vehicle that has inserted compartments, a battery housing 615, and/or a motor driver housing 612 to house various sensors and electronic circuits for the electric-powered personal transportation vehicle. The hollow cavities in the board and/or inserted compartments may also house the electronic sensors.

Figure 12:
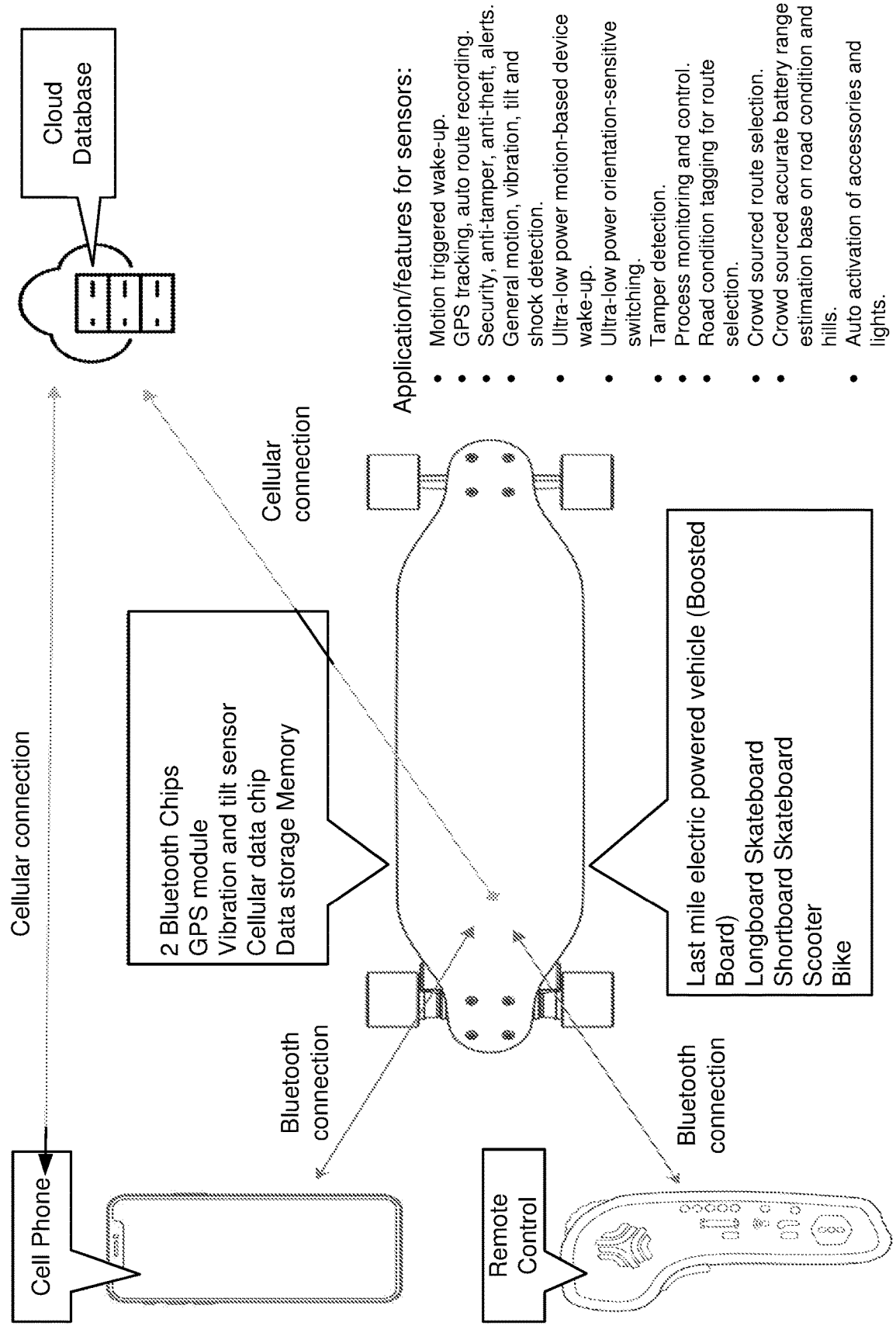
FIG. 12 illustrates an example embodiment of an electric-powered personal transportation vehicle that has a sensor feedback network.

FIG. 12 illustrates an example embodiment of an electric-powered personal transportation vehicle that has a sensor feedback network.

The electric-powered personal transportation vehicle may have a sensor feedback network 1200 integrated into the personal transportation vehicle. The electric-powered personal transportation vehicle may have different sensors, such as one or more of vibration, accelerometers, gyros, GPS, temperature, humidity, ambient light, and other sensors, integrated into components of the board to collect information that is fed back. The information may be fed back to various components on the board, such as the controller, as well as to an external network. The sensors may be used to create features for users of the electric-powered personal transportation vehicle, such as best routes, best times to ride, safety warnings, and others. For example, the vibration, accelerometer, gyros, and GPS sensors may collect information on the route and the user riding habits to send feedback to the user and supply empirical data about road conditions to a central community server to track road conditions. The information about local road conditions specific to that user may be downloaded and supplied to the electric-powered personal transportation vehicle so that the board can use the GPS to give the user information on upcoming road conditions. Likewise, various components can convey information to the user. For example, a speaker in the wireless remote can be installed to play music or make sounds to convey information about the motors or other parts of the board, and/or convey navigation information to the user. Similarly, the haptic motor in the wireless remote can communicate information to the user, with possibly some LED's built into the remote to convey additional information. Additionally, even without a sensor system, a community board can be set up to collect user input on road conditions and then broadcast that information to the on-board app system for the personal transportation vehicles and use their GPS to alert the user to local road conditions. The personal transportation vehicle may have additional sensors such as an antitheft system, built into the wireless remote and/or software for the motor, that perform an identity check on the user (set of authorized users) before allowing the motor to drive the wheels.

Again, the vehicle may use various types of sensors in its sensor network. The sensors are located on the board, in the housings connected to the board, in the board, and/or in the wireless remote. Several examples of the sensors in its sensor network may include the following.

The board has an accelerometer installed in the motor driver to detect motion and close electrical contacts in the motor driver circuit to support motion triggered wake-up. The battery electrically connects to and powers one or more sensors for the personal transportation vehicle including an accelerometer that cooperates with a motor driver circuit for the motors to detect motion; and in response, to close electrical contacts in the motor driver circuit to support a motion triggered wake-up of the personal transportation vehicle.

The board has a Bluetooth circuit and app on the board that works with the vehicle's mobile app and a GPS chip installed in user's smart phone to allow GPS tracking, auto route recording, and auto route navigation for the user.

The vehicle's mobile app can be set for the user to input a pin or password in order to allow the motor to start. Likewise, the vehicle's mobile app can wait to establish a Bluetooth connection with a registered device to allow the motor to start. The board has a Bluetooth circuit and app on the board that works with the board's mobile app and a GPS chip installed in user's smart phone to show the current location of the board when a find my vehicle is activated. Alternatively, the GPS chip may be installed in the board itself. The vehicle's systems provide security from turning on the motor, anti-tamper, anti-theft techniques including sending the alerts and making an alarm sound. Like the other sensors, the battery electrically connects to and powers an anti-tamper circuit to allow a motor driver circuit to power the motors merely after a condition occurs selected from a group consisting of i) a user supplies a password, ii) a short ranged wireless communication circuit of the personal transport vehicle establishes a connection with a trusted smart device registered to a user of the personal transportation vehicle, and iii) any combination of both.

The board has an accelerometer installed in the motor drive and/or a vibration sensor to measure when the board suddenly moves (which could be an indication of someone stealing the board) and when the board suddenly stops (which could be an indication of an accident). The accelerometer may be used to indicate general motion, vibration, tilt and shock detection. The battery electrically connects to and powers one or more sensors for the personal transportation vehicle including an accelerometer to determine vibration and tilt of the personal transportation vehicle to record road conditions and then send the road conditions for analysis. The battery electrically connects to and powers a short ranged wireless communication circuit and an application resident in a memory on the personal transportation vehicle to send the road conditions to an application for the personal transportation vehicle resident on a smart device of the user, and then uses a network, such as the Wi-Fi or cellular network on the user's smart phone, to relay that information up to a cloud platform so that a community of users will be made aware of the road conditions in that geographical location. A road condition application in the cloud server can then plan a route based on the road condition and send that guidance back out to the community in general via each user's application for the personal transportation vehicle resident on the smart device.

The vehicle can have a firmware application that works in the background to periodically wake up the electronics on the board from sleep. The board uses the sensors and electronic circuits for an ultra-low power motion-based device wake-up.

The vehicle can have a tilt and vibration sensor to assist the motor and battery when going uphill, downhill, etc. The tilt and vibration sensor provide an ultra-low power orientation-sensitive switching.

The vehicle can have a tamper mobile app. When the mobile app is set to park, then when the board is moved as detected by the accelerometer, then an alert notice is sent to the smart phone and/or other smart device to alert the user that the board is being moved. The accelerometer and its security circuit detects when someone physically picks up the board to provide tamper detection. The battery electrically connects to and powers one or more sensors including an accelerometer and an anti-tamper circuit configured to send a notice indicating that the personal transport vehicle is being moved to a trusted smart device registered to the user of the vehicle when the personal transport vehicle is set to park, and the accelerometer and the anti-tamper circuit indicate that the personal transportation vehicle is moved.

A cellular data chip installed on the board cooperates with a process monitoring and control circuit to monitor and then report on the motor, wheels, etc. that are not functioning properly. The communication circuit conveys this report via the Wi-Fi or cellular network, the user's smart device is using.

The vibration detector and process monitoring and control circuit provides road condition tagging for route selection. A vibration detector detects road conditions, smooth or rough, and then the monitoring and control circuit relays that information up to the cloud so that the community in general will be made aware of road condition in a geographical location, and an Artificial Intelligence engine on the platform can then plan the most smooth route and send that guidance to the personal transportation vehicle user community in general to the mobile app on the users' smart phone. (e.g. crowd sourced route selection)

A cellular data chip installed on the board cooperates with a process monitoring and control circuit to provide a crowd sourced, accurate battery range estimation, based on road condition and hills.

A luminosity sensor may automatically activate lights on the vehicle.

Next, the wireless remote puts the power over the board's operation in of the palm of the rider's hand. The wireless remote is configured to control the acceleration and deceleration of the electric-powered personal transportation vehicle, via the motor driver, from a fast or slow acceleration to quick or gentle braking. The high performance, Bluetooth-enabled wireless remote acts as a safe, secure link between the rider and the Bluetooth-enabled wireless circuit in the housings of the board. The remote may or may not use the Bluetooth protocol for transmission. Any variety of wireless transmission protocols may be acceptable for transmission of signals to and from the electric-powered personal transportation vehicle.

Web Site

The web site is configured as a browser-based tool or direct cooperating app tool for configuring, analyzing, and communicating with the electric personal transportation vehicle.

A Diagnostic and an Artificial Intelligence Program

A diagnostic app and an artificial intelligence program are configured to give feedback and adjust various settings on the skateboard, such as maintenance reminders and diagnostics. For example, maintenance indicators can be provided to a user automatically through an app on the smart phone. Likewise, automated diagnostics can be made by the artificial intelligence program by analyzing parameters such as audio, images, mileage, and video processing to determine recommended maintenance for the board. Thus, an app on a smart phone can record the sounds of the wheels and the motor and the belt drive system to determine recommended maintenance for the board. The app on the smart phone or the backend server can then analyze the captured sound and perform a diagnostic on that sound to determine what issues/problems that the board currently has and provide feedback to the user on what to do such as change the belts, etc.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system), a second mobile computing device (e.g., smartphone with an iOS-based operating system), a first wearable electronic device (e.g., a smartwatch), a first portable computer (e.g., laptop computer), a third mobile computing device or second portable computer (e.g., tablet with an Android- or iOS-based operating system), a first electric personal transportation vehicle, a second electric personal transportation vehicle, and the like. The client computing system can include, for example, the software application or the hardware-based system in which may be able exchange communications with the first electric personal transportation vehicle, and/or the second electric personal transportation vehicle. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer (e.g., the client computing system) and the server computing system can both initiate and respond to communications, their communications can be viewed as peer-to-peer. Additionally, the server computing systems include circuitry and software enabling communication with each other across the network.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application may be resident on the computing device and stored in the memory.

It should be noted that the present design can be carried out on a computing system. However, the present design can be carried out on a server, a computing device devoted to message handling, or on a distributed system in which different portions of the present design are carried out on different parts of the distributed computing system.

Another device that may be coupled to bus is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
an electric powered personal transportation vehicle, with one or more wheels driven by one or more electric motors, where the electric motors are powered by one or more batteries;
a set of universal battery mounting hole locations and a reserved space for one or more battery housings on a board for the personal transportation vehicle, where the reserved space on the board for the one or more battery housings that house one or more battery packs is set to not interfere with an operation of the motors or the wheels; and
a motor driver and the electric motors are designed to operate over at least a ten volt range of input voltages to support different battery packs that differ in amp-hour capacity.

2. The apparatus of claim 1, where a first battery housing has multiple pockets and each pocket is designed to house its own battery cell, where the first battery pack made up of the battery cells in a first pocket of the first battery housing differs in amp-hour capacity than a second battery pack in a second pocket of the first battery housing.

3. The apparatus of claim 1, where a first battery housing has a different length, width, or height, to give the different shape than a second battery housing, which is constructed to mount in the same set of universal battery mounting hole locations and reserved space for the one or more battery housings on the board, where the first battery housing houses the first battery pack that differs in amp-hour capacity than a second battery pack in the second battery housing.

4. The apparatus of claim 1, where the set of universal battery mounting hole locations use reinforced connection points in the hole locations of the board to make these mechanical connection points between the housing and the board, durable and vibration resistant to maintain a solid connection without fracturing or deforming at these connection sites.

5. The apparatus of claim 1, where the first battery pack electrically connects to and powers one or more sensors for the personal transportation vehicle including an accelerometer that cooperates with a motor driver circuit for the motors to detect motion; and in response, to close electrical contacts in the motor driver circuit to support a motion triggered wake-up of the personal transportation vehicle.

6. The apparatus of claim 1, where the first battery pack electrically connects to and powers an anti-tamper circuit to allow a motor driver circuit to power the electric motors merely after a condition occurs selected from a group consisting of i) a user supplies a password, ii) a short ranged wireless communication circuit of the personal transport vehicle establishes a connection with a trusted smart device registered to a user of the personal transportation vehicle, and iii) any combination of both.

7. The apparatus of claim 1, where the first battery pack electrically connects to and powers one or more sensors for the personal transportation vehicle including an accelerometer to determine vibration and tilt of the personal transportation vehicle to record road conditions and then send the road conditions for analysis.

8. The apparatus of claim 7, where the first battery pack electrically connects to and powers a short ranged wireless communication circuit and an application resident in a memory on the personal transportation vehicle to send the road conditions to an application for the personal transportation vehicle resident on a smart device, and then uses a network to relay that information up to a cloud platform so that a community of users will be made aware of the road conditions in that geographical location, and an application in the cloud server can then plan a route based on the road condition and send that guidance back out to the community in general via each user's application for the personal transportation vehicle resident on the smart device.

9. The apparatus of claim 1, where the first battery pack electrically connects to and powers one or more sensors including an accelerometer and an anti-tamper circuit configured to send a notice indicating that the personal transport vehicle is being moved to a trusted smart device registered to the user of the vehicle when the personal transport vehicle is set to park, and the accelerometer and the anti-tamper circuit indicate that the personal transport vehicle is moved.

10. A method for an electric powered personal transportation vehicle, comprising:
constructing the electric powered personal transportation vehicle, with one or more wheels driven by one or more electric motors, where the electric motors are powered by one or more batteries;
making a set of universal battery mounting hole locations and a reserved space for one or more battery housings on a board for the personal transportation vehicle, where the reserved space on the board for one or more battery housings that house one or more battery packs is set to not interfere with an operation of the motors or the wheels; and
using a motor driver, coupled to the universal battery mounting hole locations, and the electric motors are designed to operate over at least a ten volt range of input voltages to support different battery packs that differ in amp-hour capacity.

11. The method of claim 10, further comprising:
constructing a first battery housing to have multiple pockets and each pocket is designed to house its own battery pack, where a first battery pack made up of the battery cells in a first pocket of the battery housing differs in amp-hour capacity than a second battery pack in a second pocket of the battery housing.

12. The method of claim 10, further comprising:
constructing a first battery housing to have a different length, width, or height, to give the different shape than a second battery housing which is constructed to mount in the same set of universal battery mounting hole locations and reserved space for the one or more battery housings on the board, where the first battery housing houses a first battery pack that differs in amp-hour capacity than a second battery pack in the second battery housing.

13. The method of claim 10,
wherein the motor driver and the electric motors operate over at least a twenty volt range of input voltages to support different battery packs that differ in amp-hour capacity.

14. The method of claim 10, further comprising:
using the set of universal battery mounting hole locations to reinforce connection points in the hole locations of the board to make these mechanical connection points between the housing and the board, durable and vibration resistant to maintain a solid connection without fracturing or deforming at these connection sites.

15. The method of claim 10, further comprising:
using the first battery pack to electrically connect to and power one or more sensors for the personal transportation vehicle including an accelerometer that cooperates with a motor driver circuit for the motors to detect motion; and in response, to close electrical contacts in the motor driver circuit to support a motion triggered wake-up of the personal transportation vehicle.

16. The method of claim 10, further comprising:
using the first battery pack to electrically connect to and power an anti-tamper circuit to allow a motor driver circuit to power the motors merely after a condition occurs selected from a group consisting of i) a user supplies a password, ii) a short ranged wireless communication circuit of the personal transport vehicle establishes a connection with a trusted smart device registered to a user of the personal transportation vehicle, and iii) any combination of both.

17. The method of claim 10, further comprising:
using the first battery pack to electrically connect to and power one or more sensors for the personal transportation vehicle including an accelerometer to determine vibration and tilt of the personal transportation vehicle to record road conditions and then send the road conditions for analysis.

18. The method of claim 17, further comprising:
using the first battery pack to electrically connect to and power a short ranged wireless communication circuit and an application resident in a memory on the personal transportation vehicle to send the road conditions to an application for the personal transportation vehicle resident on a smart device [of the user], and then uses a network to relay that information up to a cloud platform so that a community of users will be made aware of the road conditions in that geographical location, and an application in the cloud server can then plan a route based on the road condition and send that guidance back out to the community in general via each user's application for the personal transportation vehicle resident on the smart device.

19. The method of claim 10, further comprising:
using the first battery pack to electrically connect to and power one or more sensors including an accelerometer and an anti-tamper circuit configured to send a notice indicating that the personal transport vehicle is being moved to a trusted smart device registered to the user of the vehicle when the personal transport vehicle is set to park, and the accelerometer and the anti-tamper circuit indicate that the personal transport vehicle is moved.

* * * * *